3,485,613
Patented Dec. 23, 1969

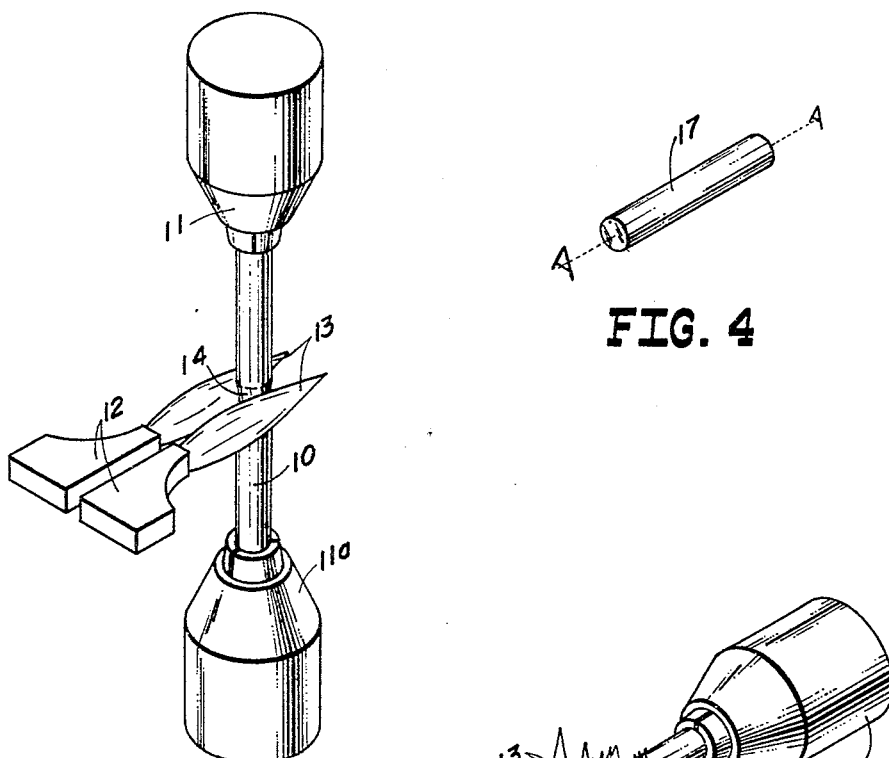
FIG. 4
FIG. 1
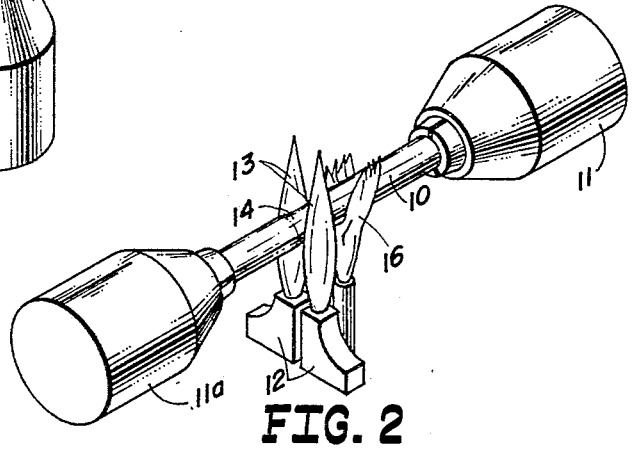
FIG. 2
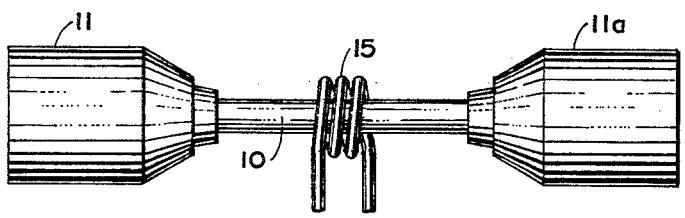
FIG. 3
INVENTORS
Andrew Herczog
Dale W. Rice
BY
*Clarence R. Patty Jr.*
ATTORNEY

United States Patent Office

3,485,613
METHOD OF PRODUCING A VITREOUS BODY BY CRUCIBLELESS FLUID ZONE TREATMENT
Andrew Herczog, Painted Post, and Dale W. Rice, Corning, N.Y., assignors to Corning Glass Works, Corning, N.Y.
Continuation-in-part of application Ser. No. 397,765, Sept. 21, 1964. This application Nov. 6, 1967, Ser. No. 684,589
Int. Cl. C03b 23/00
U.S. Cl. 65—60     9 Claims

ABSTRACT OF THE DISCLOSURE

This invention relates to a method of producing an elongated glassy body of closely controlled composition and distribution of components by heating a portion of the body so as to form a fluid zone thereat, and causing the fluid zone to traverse the length of the body. This method can be utilized to fabricate solid glass bodies from preformed or presintered glass batch materials, to homogenize the composition of a solid glass body, or to incorporate new constituents into a glass body.

---

This application is a continuation-in-part of our copending application Ser. No. 397,765, filed Sept. 21, 1964 now abandoned.

The fluid zone melting technique of the present invention may be applied to a rod of glass batch materials which is to be melted to form a glass. It may also be applied to a glass rod which is to be remelted to improve homogeneity, to add constituents thereto, or to alter the distribution of constituents.

In the preparation of high purity glasses by conventional melting methods, contamination from crucible materials is often a problem. This is particularly true for high melting glasses. This problem is overcome by the technique of fluid zone melting in accordance with the present invention, since a containing crucible is not employed. As a result, contamination from crucible materials is eliminated and the purity of the glass may be maintained. Considerable advantage is found in the use of fluid zone technique for melting glass rods of suitable composition and purity for laser applications, and other uses where high purity is essential. Articles having a homogeneous composition and structure are normally desired but for certain applications, e.g., semiconductor components, however, it may be desirable to have a body portion of one composition with a surface layer of another. Articles which are a uniform mixture of crystalline materials and glass can also be produced which derive their utility from the presence of such crystals therein, e.g., a glass body containing crystals which exhibit luminescence.

The refractory metals commonly employed as crucible materials for glass melting include platinum, rhodium, and platinum-rhodium alloys. Such metals are selected for their chemical inertness to most molten glasses and for their refractory properties. However, the upper temperature at which such materials may be employed is about 1700° C. for platinum, 1800°–1850° C. for platinum-rhodium alloys, and 1900° C. for rhodium.

A specific advantage of the present invention is that it permits the melting of glass, in a useful form, at temperatures in excess of 1900° C., where the usual crucible materials fail.

The technique of the present invention also provides an efficient method of homogenizing, or uniformly distributing constituents in, glasses. In addition, a method is provided for the controlled distribution of constituents within a glass.

These and other advantages will be apparent from the following description and accompanying drawings.

In its broadest aspect, the process of the present invention comprises establishing a small fluid zone in an elongated body of glass or glass batch materials and causing the fluid zone to traverse at least a portion of the length of the body. In a practical embodiment, the fluid zone technique of the present invention may be practiced by mounting a cylindrical body, such as a rod of glass, or glass batch material compacted to rod shape, between two chucks, axially rotating the body, applying heat to a portion of the body to establish a fluid zone therein, and moving the fluid zone along at least a portion of the body. This movement of the fluid zone is accomplished by moving the heat source, the body, or both, relative to one another in parallel relation and along the body's longitudinal axis.

The fluid zone may be established in a rod by supporting the rod between two chucks and rotating the chucks synchronously while heat is applied to a portion of the rod. The orientation of the rod and chucks may be horizontal, vertical, or at an intermediate angle between horizontal and vertical. When the heated portion of the rod becomes fluid the rotation of the body causes mixing of the glass constituents in the fluid zone. If there is relative rotation of the chucks or the ends of the body, the mixing is more efficient. The term mixing, as used hereinafter, when referring to the action in the fluid zone, is intended to mean the same as and be synonymous with movement and/or migration of the constituents in the fluid zone.

Alternatively, the establishment of the fluid zone may involve the use of two separate rods. The rods are axially aligned and rotated, either synchronously or asynchronously, and the free ends brought together, while heat is applied to fuse the free ends in a manner similar to the way in which a lampworker joins two straight rods of glass. The fluid zone is thus established at the junction point.

After the establishment of a fluid zone, the zone is caused to travel along the length of the rod while the rod is continually rotated. One or more passes of the fluid zone may be made on the same sample rod.

The purposes of the rotation are threefold: (1) to insure uniform heating around the circumference of the rod, (2) to maintain axial symmetry of the treated material, and (3) to cause migration of the constituents in the fluid zone; in the case of rapid counter-rotation, thorough mixing, or migration, of the material is aided by a narrowed cross-section as a result of hydrodynamic action in the fluid zone. Whether the ends of the rod are rotated synchronously or asynchronously will depend on the effect which it is desired to produce in the glass. For example, if homogenization of the glass material is desired, asynchronous rotation may be advantageously used; although, homogenization will occur when using synchronous rotation. If asynchronous rotation is employed, the two ends may be rotated in opposite directions or in the same direction at different speeds. This difference in rotation speeds results in more efficient mixing of the constituents in the fluid zone. However, if it is desired to effect a particular distribution of constituents, such as is hereinafter described, it may be advantageous to use synchronous rotation.

The term "fluid zone" as used herein, refers to the heated portion of the rod being treated, wherein the viscosity of the glass is less than about $10^{13}$ poises. At viscosities above about $10^{13}$ poises, mass transfer by flow, movement, or migration, becomes so slow as to be considered impractical. The minimum viscosity is interrelated with the speed of rotation, temperature, surface tension, composition of the glass and other similar parameters. Therefore, no definite value for the minimum viscosity can be stated since each situation will depend on the particular parameters involved. It will be apparent, nevertheless, that the viscosity of the glass must be such that the structural integrity of the rod will be maintained in the fluid zone. This value can be readily determined empirically for each glass.

An additive, such as an oxide film, may be incorporated into a glass rod at glass viscosities ranging up to about $10^{13}$ poises, using synchronous rotation, or asynchronous rotation, with low relative rotation rate. If rapid counter-rotation is employed, for example, to achieve thorough mixing, the viscosity at the part of the fluid zone where mixing occurs must be below about $10^5$ poises.

The advantages of the fluid zone technique of the present invention, as well as its practices, will be more fully appreciated with reference to the following description of three distinct types of applications for the technique.

CRUCIBLELESS MELTING

The crucibleless melting of a glass batch by fluid zone technique involves the mixing of finely divided glass batch materials and the pressing, or otherwise shaping, of the batch materials into a rod. The batch materials may then be melted and transformed to a vitreous state by the application of the fluid zone technique to the preshaped rod. It may be desirable to presinter the rod to impart to it sufficient strength for subsequent handling. Strength and body may also be imparted to the rod by mixing an appropriate binding agent with the batch materials and subsequently removing the binding agent by presintering or by heat during the melting operation.

In another method, the batch material may be packed in a glass tube which will serve to contain the batch materials during the fluid zone melting operation. When fluid zone melting is applied, the glass tube may become part of the final glass rod or may be removed, partly or completely, by volatization, depending on the process conditions.

HOMOGENIZATION

The fluid zone technique is particularly useful where it is desired to remelt a glass in order to improve homogeneity through mixing or migration, or where it is desired to melt and mix together two or more glasses, or to melt together a glass and an additive thereto. If the application simply involves the remelting of the glass in order to afford mixing, the fluid zone technique is applied to a preformed rod of the glass material. It should be noted that by proper control little, if any, of the constituents, once in the glass body, will volatilize from the surface during the homogenization process.

Where it is desirable to blend two or more glasses, a composite body may be formed wherein the glasses are positioned side by side or one inside the other such as a glass rod in a tube of a second glass and so on. The fluid zone technique is then applied to the composite body.

In some instances, it may be desirable to incorporate an additive into an existing glass. This may be accomplished by filling the bore of a hollow elongated glass body, such as a capillary tube, with a material to be blended into the glass of the tube and subjecting the glass to the fluid zone treatment. As the glass is melted, the material within the center portion of the glass is mixed into the molten portion. In this manner, the additive may be uniformly distributed throughout the final glass rod.

Alternatively, a glass rod may be coated with a film of the additive material and then subjected to fluid zone treatment. In this case, the outer film is mixed or caused to migrate into the final glass rod.

Still another alternative involves the use of a rod of porous glass impregnated with the desired additive. Additives, such as metal salts, may be incorporated in porous glass by the method described in U.S. Patent No. 2,303,756 to Martin E. Nordberg and Harold E. Rumenapp. After impregnation with the desired additive and consolidation of the porous glass, the rod may be remelted and homogenized by means of the fluid zone technique.

In still another method, if flame heating is employed, small amounts of various additives may be mixed or be caused to migrate into the glass by feeding the additives through the flame to the fluid zone. Some volatilization losses of additives may be experienced during application and before the additive migrates into the glass.

For the homogenization of glass, it is most advantageous to use independent rotation of the chucks to afford the best possible mixing. However, homogenization does occur during synchronous rotation.

The advantages of homogenization of glass in this manner are: thorough mixing of the constituents; elimination of "stones" by use of high temperatures; and the elimination of contamination by crucible materials.

RADIAL CONCENTRATION GRADIENT

A further embodiment of the present invention relates to the use of fluid zone techniques to produce a glass rod having a radial gradient in composition which will result in a corresponding gradient in properties such as refractive index, thermal expansion coefficient, or chemical properties. In the case of the refractive index gradient, sections with flat polished ends will behave as lenses; in other cases the surface could be made to have different electrical properties than the core.

Radial composition gradients can be produced by partial volatilization of one or more constituents in a glass rod during the fluid zone process. Glasses containing volatile constituents such as Na, K, Cd, Pb, etc. lose a portion of such constituents through volatilization when subjected to high temperatures. Since the composition change resulting from this volatilization is greatest at the surface of the rod and at least at the center, a radial gradient in composition is produced with a corresponding gradient in refractive index. The amount of material volatilized is governed by the volatility of the constituents, the temperature at which the fluid zone is maintained, and the speed at which the fluid zone traverses the length of the rod. A greater effect in refractive index gradient is obtained when the volatile component is one having a large ionic radius, such as Cs, Rb, Pb, K, or Na.

When radial concentration gradient is to be produced through volatilization of certain constituents, synchronous or low relative rotation of the two ends is employed so as to retard migration of constituents in the fluid zone and thus allow the volatilization to effect the distribution of constituents. For this purpose, it is generally preferable to employ relative rotation rates less than about 600 r.p.m. However, special conditions of temperature, viscosity, volatility of constituents, and zone travel rate may permit higher relative rotation rates to be employed.

Radial concentration gradients may also be produced in a glass rod by coating the rod with an oxide film and applying fluid zone treatment for such length of time as to cause only a part of the oxide film material to migrate into the rod.

The process of the present invention is further described with reference to the accompanying drawings wherein:

FIG. 1 shows a vertical fluid zone apparatus employing flame heating means.

FIG. 2 illustrates the use of a cooling means in conjunction with a flame heating means in fluid zone heating in a horizontally disposed rod.

FIG. 3 shows a horizontal fluid zone apparatus employing electrical heating means.

FIG. 4 is a schematic perspective view of an optical element having a refractive index gradient, prepared in accordance with the present invention.

In FIG. 1, a glass rod 10 is mounted in, and rotated by, two vertically disposed chucks 11 and 11a while burners 12 travel in a direction parallel to the length of the rod. A small fluid zone 14 is produced at the point where the flames 13 heat the glass rod. In flame heating, best results are obtained through the use of two or more flames directed tangentially on the circumference of the rod. Under these conditions, it is possible to stabilize the diameter of the zone. The downward flow of material due to gravitational and centrifugal forces at the fluid zone causes a narrowing of the diameter at this point. As the contact between the flames and the rod becomes less intimate, the heat transfer decreases, the zone becomes cooler and the decrease of zone diameter stops.

In FIG. 2, a fluid zone 14 is produced by flame heating in a horizontally disposed rod. In addition, oxygen jet 16 has been placed adjacent to the fluid zone to stabilize the material in the glass state by more rapid cooling of the glass rod after the fluid zone has passed.

In FIG. 3, fluid zone 14 is produced by electrical heating coil 15.

In FIG. 4, a glass rod 17, having a refractive index gradient prepared in accordance with this invention, is shown in use as a simple optical system.

The fluid zone process conditions may be varied considerably depending on the objective. The primary process conditions to be considered are the viscosity of the fluid zone, the absolute and relative rate of rotation of the rod, zone length, zone diameter, and travel rate of the zone. Usually, low viscosity and high relative rotation rates will be used for melting, fining, and uniform dispersion of added materials. For preparation of a glass with a radial gradient in composition, synchronous rotation or a low relative rotation rate will normally be employed.

The maximum rotation rate is governed by the dynamic balancing of the sample rod and by the viscosity-temperature characteristics of the glass. Excessively high rotation rates may result in violent vibration and breakage of the sample. The larger the variation of viscosity with temperature, the narrower will be the fluid zone for a given temperature distribution, and the faster the rotation rate may be without undesired effects due to centrifugal forces acting on the fluid portion of the rod. Under normal operating conditions, the absolute rotation rate need not exceed about 4000 r.p.m. If counter-rotation is employed, the relative rotation of the two ends may be as high as 8000 r.p.m. or higher.

The lower limit of the absolute rotation rate is determined by the necessity of obtaining circumferential uniformity of temperature. This will depend on the method of heating and the diameter of the rod. Rotation rates as low as 1 r.p.m. and lower may be employed.

A very low relative rotation rate may be advantageously used during a first melt of batch materials where the primary concern may be to maintain essential axial symmetry of the rod rather than to obtain complete homogeneity. The preparation of a rod having good axial symmetry aids in achieving a dynamic balance which will permit high relative rotation rates, and thus better mixing in subsequent passes.

The travel rate of the fluid zone is determined by the rate of mixing and melting. For most purposes, a travel rate of about .1 to 5 mm./min. is satisfactory. However, in some cases, higher travel rates are used to advantage. For example, where devitrification has occurred in a glass being treated, a final melt-quench pass may be used to return the material to a vitreous state. In such cases, synchronous rotation is generally used and travel rates up to 40 mm./min. or higher may be employed.

In general, the faster the relative rotation the more efficient the mixing and, thus, the faster the travel rate may be to obtain a given degree of homogeneity in the glass.

If the spacing of the chucks remains constant, the flow of material through the fluid zone caused by surface tension, gravitational and/or centrifugal forces, will result in a narrowing of the rod diameter at the fluid zone. The zone diameter will depend on the viscosity and temperature coefficient of viscosity of the materials. Better mixing is achieved with smaller zone diameters. However, for practical purposes, it is preferable that the ratio of zone/rod diameter be at least about 0.1. At ratios below about 0.1, it becomes difficult to prevent the sample rod from parting at the fluid zone.

Zone diameter can be changed by varying the relative rotation, temperature, and speed of travel of the fluid zone. In addition, zone diameters may be altered by adjusting the spacing of the chucks. If process conditions are equal, the zone will generally be smaller in a vertically-operating apparatus than in a horizontal apparatus. This results from the force of gravity acting to cause a downward flow through and from the fluid zone in a vertically disposed rod. In a horizontal rod, the force of gravity is perpendicular to the axis of the rod and may be compensated for by the rotation of the rod. For this reason, the adjustment of zone diameter is more readily accomplished in a horizontally-operating apparatus.

Any of a variety of heating means may be employed to produce the fluid zone. For example, electric resistance coils, induction coils, flame heating or other heating means may be used. We have found it convenient to use flame heating means such as that depicted in FIG. 1, with premixed hydrogen-oxygen or other fuel gases.

The length of the fluid zone must be limited to the extent necessary in order that the zone remain physically stable. If the fluid zone is too large, deformation of the rod due to centrifugal force, may result. The limits of length within which the zone will remain physically stable depend on the viscosity and heat transfer characteristics of the material being treated, the absolute and relative rates of rotation, the travel rate of the zone and the diameter of the rod. As a result, considerable variation in zone length is possible, depending on the conditions. For most conditions, ratios of zone length to rod diameter of between 3.0 and 0.1 for zone viscosities less than about $10^{13}$ poises and between 1.0 and 0.1 for viscosities less than about $10^5$ poises, are satisfactory. However, adjustment of process conditions will permit considerable variation of these ratios.

The length of the fluid zone may be shortened by quenching the portion of the rod emerging from the heat. This may be accomplished by means of a cooling coil adjacent to the heating means. Other quenching means may also be employed. For example, a stream of cool gas may be directed at the portion of the rod emerging from the heated zone in the manner depicted in FIG. 2.

The quenching technique may also be used to advantage to prevent devitrification. Glasses which devitrify easily may be cooled quickly in this way before devitrification occurs. Strains resulting from the rapid cooling can be removed by subsequent annealing.

The following specific examples will serve to further illustrate the invention and the manner in which it may be practiced:

EXAMPLE I

A silica tube (7 mm. OD, 5 mm. ID) was filled with a batch mixture consisting of 95% by weight $SiO_2$, 1% $ZrO_2$, and 4% $Nd_2O_3$. The tube containing the batch mixture was then baked out at about 1200° C. and $10^{-6}$ mm. Hg and the ends sealed off. The tube was then mounted horizontally between two chucks and rotated synchronously at 250 r.p.m. Two oxy-hydrogen flames were directed tangentially at the tube and a fluid zone was established. The estimated temperature of the fluid zone was about 2000° C. The fluid zone was moved along the length of the tube at a rate of 1.35 mm./min. by moving the oxy-hydrogen burners along a screw feed mechanism. A slightly reducing flame was employed so that most of the silica tube was volatilized. At the end of the pass, the composition of the resulting rod of fluid batch material was substantially the same as the composition of the starting batch mixture.

EXAMPLE II

A rod made as in Example I was homogenized by a second pass of the fluid zone along the rod. For the second pass, a travel rate of 1.34 mm./min. was employed and the chucks were counter-rotated at about 2400 r.p.m. relative rotation. After this second pass there was little, if any, loss of constituents due to volatilization.

Finally, a quenching pass was made at 325 r.p.m. synchronous rotation and a zone travel rate of 37 mm./min. During the quenching, an oxygen quenching jet was directed at the portion of the rod emerging from the flame.

The finished rod was a homogeneous, optically clear glass rod, 5 mm. in diameter, and having a uniform composition calculated on the basis of the weight loss of silica, in weight percent, of 96% $SiO_2$, 0.8% $ZrO_2$, and 3.2% $Nd_2O_3$.

EXAMPLE III

A powdered mixture comprising, in percent by weight, 80.0% $SiO_2$, 15.8% $Al_2O_3$, 3.2% MgO, and 1.0% $Nd_2O_3$ was mixed with about 5% by weight of hydroxypropyl methylcellulose binding agent. The mixture was extruded to form a rod 8 mm. in diameter which was then sintered at 1200° C. The sintered rod was mounted between two vertically disposed chucks in a manner similar to that depicted in FIG. 1.

A preliminary melting pass was made with a fluid zone travel rate of 0.31 mm./min. employing an asynchronous rotation wherein the chucks rotated in the same direction with only a slight difference in rate of rotation.

A second pass was made using a zone travel rate of 0.98 mm./min. and relative rotation rate increased to about 1000 r.p.m. The resulting glass rod was homogeneous, optically clear, and had a diameter of 5.0 mm. The composition of the resulting rod was substantially the same as the composition of the starting batch material indicating that there were little, if any, volatilization losses.

EXAMPLE IV

A rod of 96% silica porous glass (Corning Code 7930) was impregnated with a solution containing $Nd(NO_3)_3$. About 0.5% by weight based on $Nd_2O_3$ was introduced into the rod, and the rod was vacuum fired to consolidate the glass. The resulting rod was about 6 mm. in diameter, optically poor, cloudy, and contained cord.

The rod was then mounted vertically between two chucks and synchronously rotated while a fluid zone was established by two oxy-hydrogen flames directed tangentially at the rod.

After the establishment of a fluid zone, the rotation was adjusted to a counter-rotation of about 2000 r.p.m. and the zone was passed along the length of the rod at 1.15 mm./min. The temperature of the fluid zone was estimated to be about 2000° C. The heated fluid zone was followed by quenching from two oxygen jets, maintained about 1–2 mm. behind the heated zone. The resulting rod was an optically clear glass containing $Nd_2O_3$ uniformly dispersed therein. Under these conditions, there were little, if any, volatilization losses.

EXAMPLE V

A rod of hard aluminosilicate glass having a composition, in weight percent, of 80.80% $SiO_2$, 15.9% $Al_2O_3$, 2.99% MgO, and 0.25% CaO was subjected to fluid zone treatment for purposes of homogenizing the glass. The initial rod was 4.7 mm. in diameter and optically poor, containing a considerable amount of cord and some small seeds. The rod was mounted between horizontally disposed chucks and a single pass was made using a counter-rotation of about 2500 r.p.m. relative rotation and a zone travel rate of 0.88 mm./min. During the treatment, the zone diameter was about 3.5 mm. and the brightness temperature of the zone, taken with an optical pyrometer, was 1800° C. The final rod was 4.6 mm. in diameter, and optically clear, containing no cord or seeds. The composition after homogenization was essentially the same as that before treatment thus indicating little, if any, volatilization losses.

The brightness temperature, as given in the foregoing example is determined by the radiation emittance characteristics of the sample. The emittance of glasses at these temperatures is not known, but for small diameter rods is estimated to be between 0.05 and 0.2. On this basis, the actual temperature of the fluid zone in the foregoing example is estimated to exceed the brightness temperature shown by 100° to 300° C. Thus, the actual temperature of the fluid zone in Example V is estimated to be between 1900° C. and 2100° C.

EXAMPLE VI

A rod of borosilicate glass 7 mm. in diameter and having an approximate composition in percent by weight of 80.6% $SiO_2$, 13.0% $B_2O_3$, 3.8% $Na_2O$, 2.2% $Al_2O_3$, and 0.4% $K_2O$, was coated with cobalt oxide. The coating was applied by pyrolytic decomposition of cobalt nitrate to produce a cobalt oxide coating a few thousand angstroms in thickness. Mixing of the cobalt oxide into the glass was accomplished by a single pass in a vertical fluid zone treatment apparatus. The fluid zone diameter was about 3.8 mm. and the brightness temperature of the zone was 1753° C. Counter-rotation of about 1000 r.p.m. and a zone travel rate of 1.55 mm./min. were employed. During the pass, the chucks were moved closer together to maintain the diameter approximately constant. The resulting rod was about 8 mm. in diameter and contained cobalt oxide uniformly distributed throughout, thus indicating that any volatilization losses after mixing were negligible.

EXAMPLE VII

The bore of a capillary tube of borosilicate glass having a 6.5 mm. OD and 0.8 mm. ID was packed with cobalt oxide. The composition of the capillary tube was similar to that of the rod described in Example V. The packed tube was subjected to a single pass, vertical fluid zone treatment using oxy-hydrogen flames. Zone travel rate was maintained at 1.5 mm./min. and a counter-rotation of about 1000 r.p.m. relative rotation rate was employed. A uniform dispersion of cobalt oxide in the glass was obtained. As a result of decreasing the distance between the chucks, during the run, the final rod had a diameter of 8 mm. A higher concentration of additive may be incorporated in the glass by this method than by the method of Example V. A greater amount of additive material can be packed in a capillary tube than can be coated on the outside of a rod. Also, there is less preferential volatilization of the additive before mixing occurs than with the surface coating method.

EXAMPLE VIII

A rod 6 mm. in diameter, of soda-lime-silica glass having the approximate composition, in percent by weight, of 72% $SiO_2$, 14% $Na_2O$, and 12% CaO, was subjected to fluid zone treatment in a vertical fluid zone apparatus to produce a radial gradient in composition. A single pass was made with oxy-hydrogen flame heating. During the pass, the rod ends were counter-rotated at a relative rotation rate of about 500 r.p.m. A zone travel rate of 1.11 mm./min. was employed. The resulting rod was 6 mm. in diameter. A center section of the rod about 25 mm. in length was cut and the ends ground flat and polished. The rod section exhibited a lens effect due to a radial gradient in refractive index. The refractive index gradient was due to controlled intentional volatilization of $Na_2O$ during the fluid zone treatment.

EXAMPLE IX

A vitreous silica tube, 5 mm. ID, 7 mm. OD and about 200 mm. in length was filled with a glass batch mixture having the following composition in percent by weight: 96.4% $SiO_2$, 0.92% BaO, 0.67% $Al_2O_3$, 2.01% $Nd_2O_3$. The filled tube was degassed at 1200° C. and $1.4 \times 10^{-7}$ mm. mercury and the ends of the tube sealed. Short lengths of 96% silica rod were sealed to each end of the tube. The tube was then mounted between two horizontally disposed chucks.

The 96% silica rods at each end allowed the tube to be mounted in the chucks by means of the rod ends so that the entire length of the filled tube was accessible for fluid zone treatment. One of the chucks could be moved along the longitudinal axis of the tube by means of a lead screw so that the tube could be longitudinally compressed or stretched during the operation. Control mechanisms, well known to those skilled in the art, were employed to govern the rate of longitudinal movement of the chuck.

A preliminary sintering pass was made utilizing synchronous rotation of about 150 r.p.m. The fluid zone was produced by two oxy-hydrogen flames directed tangentially to the tube. The estimated temperature of the fluid zone was about 2000° C. The flames were directed from a burner, movable along the longitudinal axis of the tube. During the pass, the burner was moved so that the fluid zone traversed the length of the tube at a rate of 1.50 mm./min. toward the fixed chuck while the movable chuck was moved in the opposite direction at a rate of 0.75 mm./min. The movement of the chuck resulted in a 50% elongation of the sample, based on the length of the original tube. The purpose of stretching the sample in this case was to aid in maintaining axial symmetry and smoothness of surface and to decrease the diameter so that better mixing could be achieved in the next pass.

A reducing flame was employed so that most of the silica tubing was volatilized during the first pass leaving essentially a rod of fused batch material.

EXAMPLE X

A rod of fused batch material, made as in Example IX, was treated by the fluid zone technique so as to volatilize the remaining portions of the silica tube and to then homogenize the fused glass batch material. A second pass was made using an oxidizing flame and a zone travel rate of 1.50 mm./min. Asynchronous rotation was employed. One chuck was rotated at 160 r.p.m. and the other at 1540 r.p.m., in the same direction, to produce a relative rotation rate of 1380 r.p.m. During the pass, the movable chuck was moved toward the fixed chuck at a rate of 0.21 mm./min. to compensate for a narrowing of the rod due to volatilization losses of silica and thus to maintain the diameter of the rod.

A third pass was made with an oxidizing flame and a zone travel rate of 3.06 mm./min. During the pass, the ends of the rod were counter-rotated at a relative rate of 6320 r.p.m. and the movable chuck was moved toward the fixed chuck at a rate of 0.61 mm./min. to compress the rod and increase the diameter of the final rod.

A fourth pass was made to further homogenize the sample. The conditions were the same as those of the third pass except that a relative rotation rate of 6560 r.p.m. was employed.

A fifth pass was made under similar conditions except that the relative rotation rate was adjusted to 4520 r.p.m. and the speed of the movable chuck was adjusted to 0.31 mm./min. to compensate for the decrease in diameter due mainly to the volatilization of silica.

The compositon of the glass rod after the fifth pass, calculated from the weight loss of silica was: 97.6% by weight $SiO_2$, 0.6% BaO, 0.5% $Al_2O_3$, and 1.3% $Nd_2O_3$.

The volatilization of silica from the surface during the foregoing treatments left a surface layer having higher expansion than the interior portion. This high expansion surface layer was removed by etching the sample in a solution of 90% HF and 10% $HNO_3$ for 30 minutes.

EXAMPLE XI

A rod prepared as in Example X was fire-polished by a final pass of the fluid zone. Synchronous rotation of 150 r.p.m. was employed. Since the purpose of this final pass was to fire polish the surface, the separation of the flames was adjusted so that each flame was moved slightly out from the surface of the rod to provide a lower temperature at the fluid zone. The zone travel rate was increased to 16 mm./min. to further aid in maintaining the fluid zone at a lower temperature than in the previous passes and to minimize volatilization of silica from the sample.

The final glass rod measured 5.9 mm. in diameter and 102 mm. in length. The rod was homogeneous and optically clear, containing no cord or seeds.

The process of the present invention may be adapted for a continuous feed operation. In such an embodiment, the heating means may be held stationary and a rod of glass or glass batch materials fed continuously past the heating means.

We claim:
1. A method for crucibleessly melting an elongated glassy body and homogeneously distributing the constituents therein comprising the steps of:
   (a) shaping a solid elongated body from glass-forming ingredients selected from the group consisting of glass batch materials, glass batch materials and a binding agent, presintered glass batch materials, and glass batch materials within the bore of a glass tube;
   (b) forming a fluid zone, having a viscosity such as to maintain essential axial symmetry of said body but less than $10^{13}$ poises, in said elongated body by
      (i) heating a portion of said elongated body with a sufficient amount of heat for a sufficient length of time to fuse said portion; and
      (ii) simultaneously axially rotating said elongated body about said body's longitudinal axis; and
   (c) moving said body in parallel relation to the heat source, thereby causing said fluid zone to move along the longitudinal axis of the body, at least once.

2. The method as recited in claim 1 wherein the ends of said body are differentially rotated so as to mix and uniformly distribute the constituents throughout the body.

3. A method for controlling the distribution of constituents in an elongated glassy body comprising the steps of:
   (a) shaping a solid elongated body from materials selected from the group consisting of glass and glass with an additive material, wherein the glass with an additive material is selected from the group consisting of a plurality of glasses, an additive material within the bore of a glass tube, a glass rod coated with an additive material, and a porous glass rod impregnated with an additive material;
   (b) axially rotating said elongated body about said body's longitudinal axis while contacting a portion of the body with a source of heat of sufficiently high temperature for a sufficient length of time to fuse said portion to form a fluid zone thereat, said zone having a viscosity such as to maintain the essential axial symmetry of said body but less than $10^{13}$ poises, and to cause the migration and distribution of the constituents of the body within said portion; and
   (c) moving said elongated body in parallel relation to the heat source, thereby causing the fluid zone to move along the longitudinal axis of the body, at least once.

4. The method as recited in claim 3 wherein the migration of the constituents in said elongated glassy body is controlled by differentially rotating the ends of said body thereby mixing and homogeneously distributing the constituents through said fluid zone.

5. The method as recited in claim 3 including distributing the constituents along a radial concentration gradient by heating the surface of said fluid zone to a temperature and for a time sufficient to volatilize at least one of the constituents from the surface of said fluid zone.

6. The method as recited in claim 3 including cooling the portion of said body adjacent the fluid zone by flowing oxygen from gas jets over said adjacent portion.

7. The method as recited in claim 3 including applying an additive material to the surface of said elongated glassy body so that the additive materials are distributed therein.

8. The method as recited in claim 7 including synchronously rotating the ends of the body so that the additive material is partially mixed and distributed along a radial concentration gradient in said fluid zone.

9. A method for cruciblelessly melting an elongated glassy body and distributing the constituents along a radial concentration gradient comprising the steps of:
  (a) shaping a solid elongated body from glass-forming ingredients selected from the group consisting of glass batch materials, glass batch materials and a binding agent, presintered glass batch materials, and glass batch materials within the bore of a glass tube;
  (b) forming a fluid zone, having a viscosity such as to maintain essential axial symmetry of said body but less than $10^{13}$ poises, in said elongated body by
    (i) heating a portion of said elongated body with a sufficient amount of heat for a sufficient length of time to fuse said portion; and
    (ii) simultaneously axially rotating said elongated body about said body's longitudinal axis;
  (c) moving said body in parallel relation to the heat source, thereby causing said fluid zone to move along the longitudinal axis of the body, at least once; and
  (d) heating the surface of said fluid zone to a temperature and for a length of time sufficient to volatilize at least one of the constituents from the surface of the fluid zone.

References Cited

UNITED STATES PATENTS

| | | | |
|---|---|---|---|
| 1,737,662 | 12/1929 | Loepsinger. | |
| 2,739,088 | 3/1956 | Pfann | 65—134 X |
| 2,998,335 | 8/1961 | Dehmelt. | |
| 2,979,386 | 4/1961 | Shockley et al. | 65—33 X |
| 3,020,132 | 2/1962 | Gunther-Mohr | 65—33 X |
| 3,177,057 | 4/1965 | Potter et al. | 65—18 |
| 3,183,193 | 5/1965 | Soden et al. | 65—137 X |
| 3,186,819 | 6/1965 | Thorington et al. | 65—109 X |
| 3,261,676 | 7/1966 | Morelock | 65—18 |
| 3,263,852 | 8/1966 | Fridrich | 65—33 X |
| 3,352,492 | 11/1967 | Cape. | |

S. LEON BASHORE, Primary Examiner

ROBERT L. LINDSAY, JR., Assistant Examiner

U.S. Cl. X.R.

65—111, 120, 134, 136, 279, 280